2,876,163

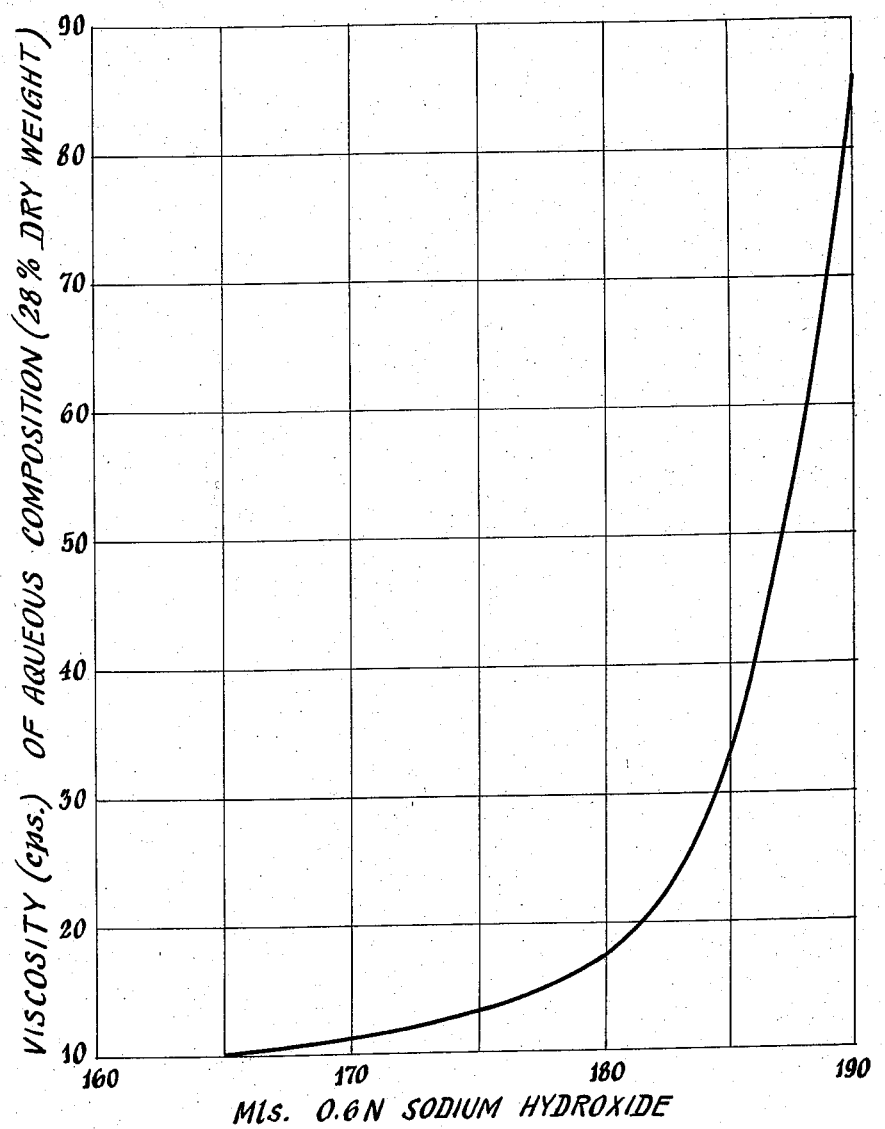

ALUMINUM CHLORHYDROXY ALCOGELS AND PROCESS OF MAKING SAME

John E. Garizio, Garden City, N. Y., Andrew M. Rubino, New Providence, N. J., and Mildred L. Almquist, Brookline, Mass., assignors to Reheis Company, Inc., a corporation of New York Application November 14, 1955, Serial No. 546,401

7 Claims. (Cl. 167—90)

This invention relates to a cosmetic composition suitable for use as an astringent and as a replacement for an ointment base and to the method of making the composition.

More particularly, the invention relates to a combination of an aluminum chlorhydroxy complex with an added electrolyte that, in certain embodiments of the invention, includes also an added alcohol.

An aluminum chlorhydroxy complex, such as one having the empirical formula $[Al_2(OH)_5Cl]_x$ is widely used in a generally satisfactory line of cosmetic antiperspirants at this time.

Such an aluminum chlorhydroxy complex is described in U. S. Patent No. 2,571,030, issued to Govett and Almquist on October 9, 1951, as the starting material in making a combination with a metal that is either monovalent or bivalent. This combination is a new complex of specially desirable properties for use as an astringent and antiperspirant.

The present invention is an improvement over that described in the said patent. The application is a continuation-in-part of application for patent Serial No. 398,276, filed by us on December 15, 1953, now abandoned.

By using, as the added electrolyte, an alkaline compound of a metal, i. e. a hydroxide, an oxide, or a salt, with an alcohol added to form an alcogel we obtain unexpected advantages. Thus we provide compositions that are effective as an antiperspirant at relatively low concentrations of the active ingredient, are readily dispensable as from collapsible tubes, may be packaged in liquid form before setting finally to an alcogel, contain no chlorine or other acidic component in addition to that present in the aluminum chlorhydroxy complex used as the starting material, have a moderately higher pH than antiperspirants made in accordance with the said patent, and are redispersible in water after being dried.

In general, we may and suitably do make the aluminum chlorhydroxy complex by the reaction of aluminum metal with aluminum chloride in contact with water, as described, for example, in the said patent. While we may use such complex of varying ratios of aluminum to chlorine, we have obtained all the numerous advantages recited above when the ratio of Al:Cl is approximately 2:1, this being the ratio in the complex of the figure.

After the complex is provided as the starting material, we add to it the alkaline compound such as sodium hydroxide or like hydroxide in dilute solution and in the amount required to give the desired viscosity in the mixture.

The alkaline compound of the said second metal selected is one that is non-toxic under the conditions of use and is water soluble, that is, soluble by reaction or otherwise in the mixture of water and the aluminum chlorhydroxy complex into which the alkaline compound is mixed. Examples of compounds that meet these requirements and that may be used are oxides, hydroxides and carbonates of lithium, sodium, potassium, ammonium, magnesium and calcium. Other alkaline compounds are described in connection with Examples 14–31, and include water-soluble salts of organic acids, such as citrates, acetates, propionates, glutamates, and tartrates, and of weak inorganic acids such as carbonates, bicarbonates, phosphates and aluminates.

The alcohol to be used must be water soluble and nontoxic as used, and must form an aqueous solution in which the aluminum chlorhydroxy complex is soluble. We obtain the best results when the alcohol is a lower monohydric alcohol such as methanol, ethanol, or a polyalkylene glycol having a molecular weight not in excess of 600 such as dipropylene glycol, or diethylene or other polyethylene glycol such as one of molecular weight within the range 200–600. There may also be used a mixture of two or more of these alcohols.

Proportions may be varied within limits depending upon the consistency desired in the finished product. Thus, we may use the alkaline compound in the proportion of 0.04–0.2 equivalent weight, calculated as the alkali hydroxide, for sufficient of the aluminum chlorhydroxy complex to correspond to a content of 1 atom of aluminum.

The proportion of the alkaline compound, more specifically, is selected to give the particular viscosity or consistency desired in our new complex, as will be described in detail under Example 1.

The alcohol may be used in proportion to adjust the finished composition to the consistency desired. Ordinarily this proportion falls within the range 23–300 volumes of the alcohol for 100 volumes of mixed aluminum chlorhydroxy complex, alkaline compound and water.

Water is used in all of our finished products. The proportion of water is within the range about 2–4 parts for 1 part dry weight of the aluminum chlorhydroxy complex. When the proportion of water is much less than 2, difficulty arises in making a uniform product. With proportions over 4, there is unnecessary dilution and loss of astringent properties in the finished product.

Our product so made is a combination of the original aluminum chlorhydroxy complex with the added alkaline compound. The product at this stage is a viscous liquid. The viscosity of the product when a liquid or the stiffness when a gel increases with the proportion of the alkaline compound incorporated. This increase becomes very rapid in the region of the upper part of the graph. In fact, the graph becomes almost vertical for proportions of the alkali only slightly greater than those plotted.

As the product so made is caused to age, as for a week or so, the viscosity of the product falls to a lower level so that the product becomes a liquid of lower viscosity which remains substantially constant for commercial purposes. The hardness, in the case of a gel, may either increase or decrease to a level that, after the aging period, also becomes substantially constant.

If this substantially constant level of viscosity has been reached, the selected alcohol should be added within a reasonable time. Otherwise a slow change, other than in viscosity, occurs; this change, if allowed to occur, may interfere with the proper alcogel formation on later addition of the alcohol. The less strongly alkaline compounds (salts) of Examples 14–31, in all proportions used, give gels only after mixing with the alcohol.

The products made as described are useful as an astringent or antiperspirant and as a replacement for ointment bases. They have a pH from about 5.0 up to 5.3 as compared to 4.3 for a representative product made as described in the said patent to Govett and Almquist. The higher pH of our new product is advantageous in approaching the pH of normal skin. Because the setting up after adding the alcohol requires some time, up to a week or more, the product made as described with the added alcohol may be filled into containers or otherwise packaged while in liquid flowable form with the assurance that the product after such packaging will set to an alcogel.

When the alcohol used is low boiling and the product is applied to the skin, evaporation causes a cooling effect and drying of the composition at a rate so rapid as to decrease spreading and absorption of the product by clothing. This property decreases the destruction of the coloring matter if any in the clothing.

Our products also are of proper consistency and effectiveness for use as an antiperspirant.

The invention will be further illustrated by description in connection with the following specific examples of the practice of it, proportions being by weight unless otherwise stated.

EXAMPLE 1

Selection of proportion of alkaline compound

The invention will be illustrated by description in connection with the use of a hydroxide of a metal as the added compound and with the attached drawing.

The single figure of the drawing shows the amount of sodium hydroxide added, in terms of mls. of 0.6 N aqueous sodium hydroxide solution, plotted against the viscosity of the resulting complex in centipoises. The 0.6 N sodium hydroxide, in the proportions shown, is diluted with water in amount to make 250 ml. of alkaline solution. This solution is then mixed with 234 ml. of the aluminum chlorhydroxy complex, as illustrated in Example 1 below.

This example illustrates particularly the method for determining in advance the proportion of alkaline compound to be used.

Before any of our compositions are made, a viscosity curve is first made for the particular aluminum chlorhydroxy complex which is to be used as the starting material. This curve is constructed from data obtained by adding various quantities of sodium hydroxide solutions to a given amount of the aluminum chlorhydroxy complex and measuring the viscosity of the resulting products after one hour. Normally we use 234 ml. of aluminum chlorhydroxy complex containing 50% of the complex on the dry basis, 0.6 N alkali hydroxide, and sufficient water to bring the amount of 0.6 N alkali hydroxide used to 250 ml. The results may be plotted, as illustrated in the drawing. The viscosities are for an aqueous composition containing 28% of solids. Tests were made with the Brookfield viscosimeter.

From such graph, there is then read the quantity of sodium hydroxide necessary to be added to this particular complex to give a finished product of the kind desired, the finished product being correlated with the viscosity shown in the viscosity curve.

Thus if it is desired to make a liquid product, either with or without an added alcohol, we select the amount of sodium hydroxide corresponding to a viscosity below 15 cps.

To make an alcogel after the addition of an alcohol, we select a quantity of sodium hydroxide corresponding to a reading on the viscosity curve of at least 15 cps. The hardness of the alcogel formed, with the additional water added as stated and with the alcohol, will increase as the sodium hydroxide proportions used are those corresponding to the higher viscosity readings. To make a firm alcogel after adding the alcohol, we select a proportion of alkali giving at least 70 cps. viscosity.

Where the addition of the sodium hydroxide results in a liquid product, this on aging for one or two weeks becomes less viscous. If, therefore, the aqueous composition is to be held for some time before adding alcohol, to make a gel, a higher viscosity reading must be selected than if the alcohol is to be added immediately. The extent of the adjustment required may be determined by first establishing the amount of alkali to obtain a finished alcogel of the consistency desired and then making a second viscosity curve after a week. This difference in alkali may then be added to the quantity shown on the viscosity curve for any normal batch of aluminum chlorhydroxy complex. The amount of this additional alkali for complexes to be stored before adding the alcohol is normally 3%–10% of the alkali originally used.

Improperly made batches of aluminum chlorhydroxy complex are detectable by their failure to give normally shaped viscosity curves and such batches are rejected for our purpose.

If it is desired to substitute another alkaline compound for sodium hydroxide, a corresponding viscosity curve should be made with the other alkaline compound selected.

Products which fail originally to gel with alcohol, because of viscosity too low before adding the alcohol, may be made into gels by the addition of alkaline compound to the alcohol, as, for example, 0.01%–0.05% of sodium hydroxide on the weight of the alcohol.

In all the examples in which an alcohol is added, the complex and the aqueous alkali are maintained in contact until any gelatinous particles first formed redissolve, before the alcohol is introduced.

In general, the setting time of a solid gel lengths with increasing softness of the final gel.

EXAMPLE 2

Using the method of selecting the proportion of alkali described in Example 1, we added 80 volumes of water to 170 volumes of aqueous sodium hydroxide solution of concentration 0.6 N. The sodium hydroxide so diluted was then mixed rapidly with 234 volumes of an aluminum chlorhydroxy complex containing 2 atoms of aluminum to 1 of chlorine, 50% by weight of total solids, and 50% of water. Vigorous agitation was employed during this addition and continued for 2 minutes after the last of the addition had been made.

The product is a liquid of pH about 5.1.

EXAMPLES 3-7

Using the same 50% aluminum chlorhydroxy complex and the same procedure in mixing, we have made the compositions of proportions and properties shown in the following table, in which all proportions are expressed as parts by volume. In those cases in which ethanol was introduced, it was introduced (except as noted for Example 5) after first mixing the diluted aqueous solution of the hydroxide with the aluminum chlorhydroxy complex. The ethanol used was denatured U. S. No. 30. The amount of the chlorhydroxy complex used in each of these examples was 234 volumes.

| Example No. | Kind of Alkali | Volume Proportions of Materials | | | Product |
|---|---|---|---|---|---|
| | | Water | 0.6 N Alkali | Ethanol | |
| 3 | NaOH | 80 | 170 | 0 | Liquid. |
| 4 | NaOH | 55 | 190 | 870 | Hard alcogel. |
| 5 [1] | NaOH | 98 | 152 | 643 | Soft alcogel. |
| 6 | NH₃ | 40 | 210 | 870 | Hard alcogel. |
| 7 | Mg(OH)₂ | 70 | 180 | 870 | Do. |

[1] In Example 5, the sodium hydroxide and alcohol were introduced simultaneously in the form of the mixture of 152 volumes of the 0.6 N aqueous sodium hydroxide solution and 643 volumes of ethanol, the ethanol in these examples being commercial material of about 95% concentration of actual ethanol by volume.

EXAMPLE 8

In this example, 50 volumes of water were mixed with 200 volumes of 0.6 N sodium hydroxide. The resulting solution was added rapidly to 234 volumes of the 50% aluminum chlorhydroxy complex with very rapid agitation. Then 870 volumes of dipropylene glycol were added and the agitation continued for 2 minutes.

The product is a solid alcogel.

EXAMPLE 9

75 mls. of water were added to 175 mls. of the 0.6 N sodium hydroxide. The resulting solution was then mixed vigorously and rapidly into 234 mls. of the 50% aluminum chlorhydroxy complex. To the mixture so made, there were added 174 mgs. of sodium hydroxide dissolved in 870 mls. of ethanol. The mixture was agitated vigorously during the formation of it and for 2 minutes after the last of the addition.

The alcogel so formed solidified.

EXAMPLE 10

To any of the compositions of Examples 2–9 above there are added eucalyptus oil in the proportion of 10 volumes to 100 volumes of the 50% aluminum chlorhydroxy complex. The eucalyptus is added in a preformed solution of it in 85 volumes of ethanol for 1 volume of the eucalyptus oil.

The products contain the eucalyptus oil in a substantially uniform dispersion of it and the oil modifies the viscosity or consistency of the final compositions. Yet they show the full fragrance of the oil.

In place of the eucalyptus oil in this example, there may be used other alcohol soluble materials of which menthol and pine oil are examples.

EXAMPLE 11

The procedure of any of the examples above is modified by the substitution, for the alkaline compound there used, of an equivalent proportion of any of the other alkalis or alkaline compounds listed herein.

EXAMPLE 12

The procedure of any of the examples above is followed, except that any other one of the alcohols described herein is substituted for the particular alcohol enumerated in the specific example. The use of the other alcohols modifies the consistency. The products with these other alcohols are satisfactory, however, in astringent and antiperspirant compositions of the kind described.

EXAMPLE 13

The procedure of any of the examples above is followed except that the aluminum chlorhydroxy complex used contains any ratio of aluminum to chlorine within the range 4–7 Al:3Cl.

In place of the metal hydroxides, the corresponding oxides may be substituted on an equal weight basis.

EXAMPLES 14–31

Use of salts with alcohol

Examples 14–31 illustrate the use of salts in combination with an alcohol as the gelling agent, in place of the alkaline hydroxides described above.

The salt to be used is one that is soluble in water, and, when dissolved in water to concentration about 1 N, gives a pH of at least 6.5, it having been found that salts giving pH substantially below 6.5 produce final alcogels that are unsatisfactory as to original clarity or instability on aging or both.

The aqueous aluminum chlorhydroxy complex initially used, to form an alcogel with the salt solution and alcohol, should be of such concentration as to contain approximately 5%–25% by weight of aluminum calculated as aluminum oxide. The complex contains 4–7 atoms of aluminum for 3 of chlorine.

In the use of a salt as the added compound, as with the alkali discussed previously, the selected alcohol is added to the mixture of the other ingredients before an alcogel is formed. The addition of the alcohol causes the formation of the alcogel promptly or after a short period of time such as an hour or so.

The alcohol is added to the other ingredients when they have been standing in mixed condition just long enough to give the viscosity which experience has shown to be appropriate for making a finished alcogel of the consistency and other properties desired.

Products made with the salts and the alcohol added before the formation of the alcogels, like those made with alkali, do not melt when warmed. Examples follow.

GELLING AGENT COMBINATION FOR 234 MLS. ALUMINUM CHLORHYDROXY COMPLEX (Al as $Al_2O_3$—23.5%; 2Al to 1Cl)

| Example No. | Salt Added | | | Ethanol added, mls. | Resulting Alcogel |
|---|---|---|---|---|---|
| | Vol., Mls. | Conc. | Kind | | |
| 14 | 250 | 0.6 N | $NaHCO_3$ | 870 | Clear, solid. |
| 15 | 250 | 0.6 N | $Na_2CO_3$ | 870 | Do. |
| 16 | 250 | 1 N | $CH_3COONa$ | 870 | Do. |
| 17 | 250 | 0.6 N | $Na_3PO_4$ | 870 | Do. |
| 18 | 205 | 1 N | $C_2H_5COONa$ | 789 | Clear. |
| 19 | 200 | 1 N | sod. glutamate | 780 | Do. |
| 20 | 200 | 1 N | $Na_2SO_4$ | 368 | Clear, solid. |
| 21 | 250 | 0.7 N | sod. tartrate | 870 | Clear, firm. |
| 22 | 250 | 1 N | sod. citrate | 870 | Clear, solid. |
| 23 | 250 | 0.4 N | sod. aluminate | 870 | Do. |
| 24 | 250 | 0.6 N | $K_2CO_3$ | 870 | Do. |
| 25 | 250 | 0.8 N | $KNaC_4H_4O_6$ | 870 | Do. |
| 26 | 250 | 0.9 N | pot. citrate | 870 | Do. |
| 27 | 250 | 0.6 N | $NH_4HCO_3$ | 870 | Do. |
| 28 | 250 | 0.7 N | $(NH_4)_2CO_3$ | 870 | Do. |
| 29 | 205 | 0.8 N | $(NH_4)_2SO_4$ | 550 | Do. |
| 30 | 250 | 1 N | $CH_3COONH_4$ | 870 | Do. |
| 31 | 200 | 0.7 N | $3MgCO.Mg(OH)_2$ | 780 | Do. |

In the tabulation of Examples 14–31, the normality of the salt solutions used are stated to the nearest first decimal place, i. e., nearest tenth.

The proportion of the ethanol is calculated, for the whole preparation, from the amount used for 20 mls. of the preparation.

In place of the ethanol, any other alcohol of kind stated earlier herein may be used.

The term "alkaline compound" is used generically in the specification and claims to refer to the alkaline hydroxides; alkaline oxides; and salts having a pH above about 6.5 in aqueous 1 N solution. The term alkaline earth metals as used in the claims is inclusive of magnesium.

What is claimed is:

1. An alcogel comprising an alcogel medium consisting essentially of a water-soluble saturated alcohol selected from the group consisting of lower monohydric alcohols and polyalkylene glycols, the latter having a molecular weight not in excess of 600, and water, and containing an aluminum chlorhydroxy complex having from four to seven atoms of aluminum for each three atoms of chlorine, and a water-soluble nontoxic alkaline compound of a metal selected from the group consisting of oxides of the alkali metals, alkaline earth metals, and ammonium; hydroxides of the alkali metals, alkaline earth metals, and ammonium, and salts of alkali metals, alkaline earth metals, and ammonium having a pH above about 6.5 in aqueous 1 N solution, selected from the group consisting of bicarbonates, carbonates, phosphates, sulfates, aluminates, acetates, propionates, glutamates, tartrates, and citrates, said alkaline compound being in an amount within the range from about 0.04 to about 0.2 equivalent weight, calculated as the alkali hydroxide, per atomic weight of aluminum present as aluminum chlorhydroxy complex, sufficient water within the range from about 2 to 4 parts per part by weight of aluminum chlorhydroxy complex being present to disperse the aluminum compound to form a nongelling liquid dispersion in the absence of the alcohol, and sufficient alcohol within the range from about 23 to about 300 volumes per volume of water being present to convert such dispersion into an alcogel.

2. An alcogel in accordance with claim 1 in which the alkaline compound is sodium hydroxide.

3. An alcogel in accordance with claim 1 in which the alkaline compound is potassium hydroxide.

4. An alcogel in accordance with claim 1 in which the alkaline compound is a sodium carbonate.

5. An alcogel in accordance with claim 1 in which the alcohol is ethanol.

6. The process of preparing an alcogel which comprises forming an aqueous alcoholic dispersion in a mixture of water and a water-soluble saturated alcohol selected from the group consisting of lower monohydric alcohols and polyalkylene glycols, the latter having a molecular weight not in excess of 600, of an aluminum chlorhydroxy complex having from four to seven atoms of aluminum for each three atoms of chlorine, and a water-soluble nontoxic alkaline compound of a metal selected from the group consisting of oxides of the alkali metals, alkaline earth metals, and ammonium; hydroxides of the alkali metals, alkaline earth metals, and ammonium; and salts of alkali metals, alkaline earth metals, and ammonium having a pH above about 6.5 in aqueous 1 N solution, selected from the group consisting of bicarbonates, carbonates, phosphates, sulfates, aluminates, acetates, propionates, glutamates, tartrates, and citrates, said alkaline compound being in an amount within the range from about 0.04 to about 0.2 equivalent weight, calculated as the alkali hydroxide, per atomic weight of aluminum present as aluminum chlorhydroxy complex, sufficient water within the range from about 2 to 4 parts per part by weight of aluminum chlorhydroxy complex being present to disperse the aluminum chlorhydroxy complex and alkaline compound to form a nongelling liquid dispersion in the absence of the alcohol, and sufficient alcohol within the range from about 23 to about 300 volumes per volume of water being present to convert such dispersion into an alcogel.

7. The process of preparing an alcogel which comprises forming an aqueous dispersion of an aluminum chlorhydroxy complex having from four to seven atoms of aluminum for each three atoms of chlorine, and a water-soluble nontoxic alkaline compound of a metal selected from the group consisting of oxides of the alkali metals, alkaline earth metals, and ammonium; hydroxides of the alkali metals, alkaline earth metals, and ammonium; and salts of alkali metals, alkaline earth metals, and ammonium having a pH above about 6.5 in aqueous 1 N solution, selected from the group consisting of bicarbonates, carbonates, phosphates, sulfates, aluminates, acetates, propionates, glutamates, tartrates, and citrates, said alkaline compound being in an amount within the range from about 0.04 to about 0.2 equivalent weight, calculated as the alkali hydroxide, per atomic weight of aluminum present as aluminum chlorhydroxy complex, sufficient water within the range from about 2 to 4 parts by weight of aluminum chlorhydroxy complex being present to disperse the aluminum chlorhydroxy complex and alkaline compound to form a nongelling liquid, and adding a sufficient amount within the range from about 23 to about 300 volumes per 100 volumes of dispersion of a water-soluble saturated alcohol selected from the group consisting of lower monohydric alcohols and polyalkylene glycols, the latter having a molecular weight not in excess of 600, to convert said dispersion into an alcogel.

References Cited in the file of this patent

UNITED STATES PATENTS

| | | |
|---|---|---|
| 2,256,505 | Thompson | Sept. 23, 1941 |
| 2,492,085 | Anderson | Dec. 20, 1949 |
| 2,571,030 | Govett | Oct. 9, 1951 |
| 2,645,616 | Govett | July 14, 1953 |

OTHER REFERENCES

Kohlschutter: Z. Anorg. Allgem. Chem., vol. 248, 1941, pp. 319–344.

Treadwell: Helv. Chim. Acta, vol. 15, 1932, pp. 980–995.